3,337,655
POLYFLUORINATED PHOSPHONATE ESTERS

Christian A. Seil, Santa Monica, Robert H. Boschan, Los Angeles, and James P. Holder, Woodland Hills, Calif., assignors, by mesne assignments, to McDonnell Douglas Corporation, Santa Monica, Calif., a corporation of Maryland
No Drawing. Filed Aug. 3, 1964, Ser. No. 387,187
4 Claims. (Cl. 260—955)

This invention relates to certain polyfluoroalkyl phosphonate esters, and is particularly concerned with the provision of novel bis (polyfluoroalkyl) benzenephosphonates.

It is an object of the present invention to provide a series of compounds having high fire resistance, high temperature stability, and which remain in liquid form over a wide temperature range and are relatively non-volatile at elevated temperatures.

Another object of the invention is the provision of polyfluorinated phosphonate esters having the above-noted properties and other advantages, and having particular utility as hydraulic fluids, heat transfer fluids, and as lubricants.

Other objects and advantages will appear hereinafter.

We have discovered that the above-noted objects are achieved according to the invention by the provision of a class of bis (polyfluoroalkyl) benzenephosphonates having the formula (I) 

where R is a polyfluorinated alkyl group which can be either a straight chain or branched chain alkyl, preferably the former, containing from 2 to 12 carbon atoms, the number one carbon atom of said alkyl groups connected to the oxygen atom of the phosphonate being free of fluorine substituents. Preferably, at least one of the carbon atoms of the alkyl groups commencing with the carbon atom in 2-position to the carbon atom connected to said oxygen atom is not fully fluorinated. Also, in preferred practice, the last-mentioned carbon atom in 1-position in the alkyl groups is connected to only one carbon atom.

The preferred bis (polyfluoroalkyl) benzenephosphonates of the invention have the formula (II) $[CX_3(CX_2)_nCH_2O]_2PC_6H_5$ with O double bond where X is a member selected from the group consisting of hydrogen and fluorine, and $n$ is an integer of from 0 to 10. Also, in preferred practice, there are at least 2 fluorine atoms in each alkyl group and at least one of the X substituents on at least one of the carbon atoms commencing with the carbon atom in the 2-position is hydrogen. Preferably, the major portion of the X substituents are fluorine.

A particularly desirable class of compounds, according to the invention, are those which have the formula (III) 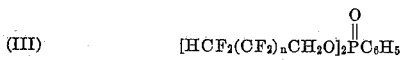

where $n$ has the values noted above.

Another class of useful compounds according to the invention are those having the formula (IV) 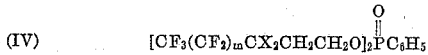

where $m$ is an integer of 1 to 2, and X has the values noted above.

In preferred practice, the value $n$ noted above ranges from about 2 to about 6, and in certain preferred phosphonates ranges from 3 to 4. Also, preferably the compounds define in the formulae noted above contain at least one fluorine atom on each of the carbon atoms beginning with the carbon atom in the 3- or 4-position of the alkyl group from its attachment to the adjacent oxygen atom. Usually, the carbon atoms of the alkyl groups beginning with the carbon atom in the 3- or 4-position and progressing to the carbon atom in the penultimate position of the alkyl group are fully fluorinated. The last carbon atom of the alkyl groups can be partially or fully fluorinated, e.g., it may have from 1 to 3 fluorine substituents thereon, preferably at least 2 fluorine atoms. Usually, but not necessarily, when the last carbon of the alkyl group is fully fluorinated, at least one of the other carbon atoms of the alkyl group commencing with the carbon atom in 2-position is not fully fluorinated. The carbon atom in the 1-position attached to the oxygen atom is free of fluorine atoms. In the preferred class of compounds represented by Formula III above, the presence of only fluorine atoms on the carbon atom in 2-position (the beta carbon atom) renders these compounds particularly thermally resistant.

The combined fluorine content of the polyfluorinated benzenephosphonates of the invention can range from about 10% to about 65%, preferably about 30% to about 65%, by weight. In the compounds noted above, the two alkyl groups of the bis (polyfluoroalkyl) benzenephosphonates hereof can be the same or different.

It has been found that the above-defined bis (polyfluoroalkyl) benzenephosphonates are particularly valuable as functional fluids, e.g., as base stocks for hydraulic fluids, and are also useful as heat transfer media and as lubricants due to the advantageous physical properties of such compounds. These properties include high fire resistance, increased temperature stability, and liquidity over a relatively wide temperature range. Thus, for example, generally these fluorinated phosphonate esters have a thermal stability in the range of about 400° to about 700° F., autoignition temperatures up to and in excess of 1,000° F., and remain liquid down to a temperature of the order of −20° to −65° F. Further, the viscosity of such fluoroalkyl benzenephosphonates at low temperatures of the order of −20° to −65° F. permit the operative use of such liquids as hydraulic fluids, cooling media and lubricants in these low temperature ranges. These compounds are also relatively non-volatile at elevated temperatures due to the high boiling point of these materials. Also, the phosphonate esters of the invention have relatively low pour points, e.g., in the range of about −20° F. to about −75° F., or lower, which, together with the relatively low viscosity of these materials at low temperatures permits the liquid compounds to be pumped without high expenditure of energy at low temperatures. Moreover, the phosphonate esters of the invention have good hydrolytic stability, and do not adversely affect materials, such as metals, e.g., steel, copper, and the like with which they may be in contact. These improved properties are believed to be due to the presence of the combination of the class of polyfluoroalkyl radicals noted above, and the benzene radical in the phosphonate esters of the invention.

The above-noted properties render the phosphonate esters or benzenephosphonates hereof particularly useful as hydraulic fluids, lubricants and cooling fluids in aircraft systems, especially modern high-speed aircraft systems.

The bis (polyfluorinated alkyl) benzenephosphonates of the invention are produced according to one convenient mode of procedure by reacting the corresponding polyfluorinated alcohol with benzene phosphonyl dichloride, in a proportion of about 2 moles of the alcohol to one mole of the phosphonyl dichloride, preferably in the presence of pyridine or any other suitable HCl acceptor. The proportion of HCl acceptor or pyridine generally employed is usually about equimolar with respect to the polyfluorinated alcohol. The mixture is then heated at reflux for a period of hours, e.g., about 6 to about 12 hours, and is then cooled and a relatively large volume of water added. The mixture separates into a lower organic phase and an aqueous phase, and the organic phase containing the polyfluorinated phosphonate ester is withdrawn. The aqueous layer is extracted with a solvent such as ether to remove organic values and the ether extract is added to the main organic layer withdrawn. The remaining organic reaction mixture is washed and then dried with a drying agent such as anhydrous magnesium sulfate. Unreacted polyfluorinated alcohol and solvents are removed by distilling at reduced pressure, and the remaining mixture is distilled at still lower pressure to recover the desired bis (polyfluoroalkyl) benzenephosphonate compounds.

Specific examples of bis (polyfluoroalkyl) benzenephosphonates of the invention are as follows:

(1) $(HCF_2CH_2O)_2\overset{O}{\underset{\|}{P}}C_6H_5$ (2) $(CF_3CF_2CH_2O)_2\overset{O}{\underset{\|}{P}}C_6H_5$ (3) $(CH_2FCF_2CF_2CH_2O)_2\overset{O}{\underset{\|}{P}}C_6H_5$ (4) $(CF_3CF_2CF_2CH_2O)_2\overset{O}{\underset{\|}{P}}C_6H_5$ (5) $(HCF_2CF_2CF_2CH_2O)_2\overset{O}{\underset{\|}{P}}C_6H_5$ (6) $(CF_3CF_2CF_2CF_2CH_2O)_2\overset{O}{\underset{\|}{P}}C_6H_5$ (7) $(CF_3CF_2CF_2CH_2CH_2O)_2\overset{O}{\underset{\|}{P}}C_6H_5$ (8) $(HCF_2CF_2CF_2CF_2CH_2O)_2\overset{O}{\underset{\|}{P}}C_6H_5$ (9) $(CF_3CF_2CF_2CH_2CH_2CH_2O)_2\overset{O}{\underset{\|}{P}}C_6H_5$

(10) $[CF_3(CF_2)_3CHFCH_2O]_2\overset{O}{\underset{\|}{P}}C_6H_5$

(11) $[CF_3(CF_2)_5CH_2O]_2\overset{O}{\underset{\|}{P}}C_6H_5$

(12) $\begin{array}{c} CF_3CF_2CF_2CH_2CH_2O \\ HCF_2CF_2CF_2CF_2CH_2O \end{array}\!\!\!\overset{O}{\underset{\|}{P}}C_6H_5$

(13) $\begin{array}{c} CF_3CF_2CF_2CH_2CH_2O \\ CF_3CF_2CF_2CH_2CH_2CH_2O \end{array}\!\!\!\overset{O}{\underset{\|}{P}}C_6H_5$

(14) $[CF_3(CF_2)_5CHFCH_2O]_2\overset{O}{\underset{\|}{P}}C_6H_5$

(15) $[HCF_2(CF_2)_7CH_2O]_2\overset{O}{\underset{\|}{P}}C_6H_5$

(16) $[HCF_2(CF_2)_7CH_2CH_2O]_2\overset{O}{\underset{\|}{P}}C_6H_5$

(17) $[HCF_2(CF_2)_9CH_2O]_2\overset{O}{\underset{\|}{P}}C_6H_5$

(18) $[HCF_2(CF_2)_9CH_2CH_2O]_2\overset{O}{\underset{\|}{P}}C_6H_5$

Preferred compounds of the invention include compounds (7), (8) and (9) above, these compounds being, respectively, bis-(3,3,4,4,5,5,5-heptafluoropentyl) benzenephosphonate; bis-(1,1,5-trihydroperfluoropentyl) benzenephosphonate; and bis - (4,4,5,5,6,6,6-heptafluorohexyl) benzenephosphonate.

As noted above, the bis (polyfluoroalkyl) benzenephosphonates hereof are produced from the corresponding polyfluorinated alcohols. A useful starting material for producing another preferred bis (polyfluoroalkyl) benzenephosphonate product is the telomer fluoroalcohol mixture containing substantial amounts of each of the odd number polyfluoro telomer alcohols from the $C_3$ to the $C_{11}$ alcohols. These alcohols have the general formula $H(CF_2\text{—}CF_2)_{n_1}CH_2OH$ where $n_1$ is an integer of from 1 to 5.

The $C_3$ alcohols of this mixture contain about 37% by weight fluorine and the $C_{11}$ alcohols of the mixture about 63% by weight of fluorine. The use of such telomer alcohol mixture is economical, since the cost of such mixture is substantially less than the cost of the individual pure polyfluorinated alcohols, and the resulting phosphonate product is highly suitable as a hydraulic fluid, heat transfer medium and lubricant.

The respective phosphonate ester compounds in the mixture of phosphonate esters produced employing the above-noted fluoroalcohols telomer mixture have the following formula:

(V) $\begin{array}{c} R'O \\ R''O \end{array}\!\!\!\overset{O}{\underset{}{P}}\!\!\!\begin{array}{c} \\ C_6H_5 \end{array}$ where R' and R'' are each $H(CF_2CF_2)_{n_1}CH_2\text{—}$ and where $n_1$ has the values defined above. R' and R'' in the above-noted formula can be the same or different. In the mixture of phosphonates obtained employing the above-noted mixture of telomer fluoro-alcohols containing the odd number $C_3$ to $C_{11}$ alcohols, R' and R'' will include $C_3$, $C_5$, $C_7$, $C_9$ and $C_{11}$ alkyl chains.

The following are examples of preparation of the invention compounds:

EXAMPLE 1

*Bis(3,3,4,4,5,5,5-heptafluoropentyl) benzenephosphonate*

To a mixture of 90.0 g. (0.421 mole) of 3,3,4,4,5,5,5-hepafluoro-1-pentanol, 36.5 g. (0.461 mole) of pyridine and 100 ml. benzene, is added dropwise with stirring 41 g. (0.21 mole) of re-distilled benzene phosphonyl dichloride. The temperature is maintained at 15°–18° C. during the addition, which is complete in 1 hour and 25 minutes. The mixture is warmed to approximately 25° C. and stirred at this temperature for 1 hour, then heated to reflux temperature and refluxed overnight. The mixture is then cooled and poured into 600 ml. of water. The bottom organic layer is withdrawn and the aqueous layer is extracted with two 100 ml. portions of ether. The ether extracts are then added to the organic layer, which is then washed with two 100 ml. portions of 5% hydrochloric acid, 100 ml. of 5% sodium bicarbonate, and 100 ml. of water. After drying over anhydrous magnesium sulfate, the solvents are removed by lowering the pressure with a water aspirator while heating.

The residue is distilled at lower pressure; the main product fraction 100.5 g. (87.0% yield) distills at 102.5°–103° C. (0.10–0.12 mm. mercury pressure).

*Analysis.*—Calculated for $C_{16}H_{13}F_{14}O_3P$: C, 34.92; H, 2.38; P, 5.63. Found: C, 35.08; H, 2.86; P, 5.55.

This bis (polyfluoropentyl) benzenephosphonate ester thus produced, compound (7) above, has a viscosity at 210° F. of 2.27 centistokes, a pour point of the order of −60° F., a density of 1.53 g./ml. at 77° F., and a thermal stability in the range of about 400° F. to about 500° F. Such phosphonate ester has a high autoignition temperature, good hydrolytic stability and high fire resistance. Such compound can be employed as a hydraulic fluid in the hydraulic systems of aircraft.

EXAMPLE 2

*Bis (1,1,5-trihydroperfluoropentyl) benzenephosphonate*

To a mixture of 300 g. (1.29 moles) of 1,1,5-trihydroperfluoropentanol, 114 g. (1.44 moles) of pyridine and 260 ml. of benzene, are added dropwise with stirring 128 g. (0.656 mole) of re-distilled benzene phosphonyl dichloride. The temperature is maintained below 45° C. during the addition, which is complete in 2¼ hours. The mixture is heated slowly to reflux and refluxed overnight.

The mixture is then cooled and washed with four times its volume of water. The bottom organic layer is withdrawn and washed with successive portions of 5% hydrochloric acid, water, and 5% sodium bicarbonate solution. The organic layer is then dried over anhydrous potassium carbonate, and the carbonate appeared to have some solubility in the organic material. Overnight a clear bottom layer separates out. This layer is extracted with ether and the extracts are added to the top organic layer, which is then dried over anhydrous magnesium sulfate. The solvents are evaporated by lowering the pressure with a water aspirator while heating. The residue is distilled at lower pressure; the product, 337.9 g. (88% yield) distills at 123°–125° C. (0.2 mm. mercury), with a yellow color, and 284.2 g. of the product are re-distilled to remove the color. The main distillate fraction, 237.4 g. (61.7% yield) distills without color at 118°–121.2° C. (0.12–0.18 mm. mercury).

The bis (polyfluoropentyl) benzenephosphonate ester thus produced, compound (8) above, has a kinematic viscosity at 210° F. of 3.71 centistokes and 7,240 centistokes at −20° F. Such compound has a pour point of about −62° F. and a density at 77° F. of 1.61 g./ml. This compound has a thermal stability of at least about 600° F., a high autoignition temperature, good hydrolytic stability and high fire resistance.

The bis (polyfluoroalkyl) benzenephosphonate ester of this example is a good functional fluid, particularly useful as a base stock for hydraulic fluids of an aircraft system operating over a wide temperature range of from about −30° to about 500° F.

EXAMPLE 3

*Bis (4,4,5,5,6,6,6-heptafluorohexyl) benzenephosphonate*

To a mixture of 57.8 g. (0.253 mole) of 4,4,5,5,6,6,6-heptafluoro-1-hexanol, 21.7 g. (0.275 mole) of pyridine, and 70 ml. of benzene, are added dropwise with stirring 24.4 g. (0.125 mole) of re-distilled benzene phosphonyl dichloride. The temperature is maintained at 15°–18° C. during the addition, which is complete in ¾ hour. The mixture is heated to reflux temperature and refluxed overnight.

The mixture is then cooled and poured into 500 ml. of water. The organic layer is withdrawn and the aqueous layer is extracted with two 100 ml. portions of ether. The ether extracts are then added to the organic layer, which is then washed with two 100 ml. portions of 5% hydrochloric acid, 100 ml. of 5% sodium bicarbonate, and 150 ml. of water. After drying over anhydrous magnesium sulfate, the solvents and excess alcohol are removed, first by lowering the pressure with a water aspirator while heating, then by reducing the pressure with a vacuum pump while heating to 98° C. the residue is then distilled; the main product fraction, 43.8 g. (60.6% yield), distilled at 143.5°–144° C. (0.79–0.86 mm. mercury). The bis (polyfluorohexyl) benzenephosphonate thus produced, compound (9) above, has a viscosity at 210° F. of 2.79 centistokes, a pour point of −60° F. and a density at 77° F. of 1.45 g./ml. The compound has high thermal stability, good hydrolytic stability and high fire resistance. Such phosphonate ester can serve as a hydraulic fluid of an aircraft system.

EXAMPLE 4

*Mixed telomer polyfluoroalcohol benzenephosphonate*

To 500 g. (1.805 moles) of mixed telomer fluoroalcohols containing the $C_3$, $C_5$, $C_7$, $C_9$ and $C_{11}$ polyfluoroalcohols as noted above, 154 g. (1.947 moles) of pyridine, and 300 ml. of benzene are added dropwise with stirring 172.6 g. (0.885 mole) of re-distilled benzene phosphonyl dichloride. The temperature is maintained at 19°–25° C. during the addition. The mixture is then heated to reflux temperature and refluxed overnight. The mixture is then cooled and 600 ml. of cold water are added. The organic layer is withdrawn and the aqueous layer extracted with ether; the ether extract is then added to the organic layer, which is then washed with hydrochloric acid and 5% sodium bicarbonate solution. After drying over anhydrous magnesium sulfate, the solvents are removed by lowering the pressure with a water aspirator. Unreacted alcohols are removed by distillation at reduced pressure. The residue is then distilled at lower pressure, the distillate comprising a mixture of benzenephosphates.

The resulting bis (polyfluoroalkyl) benzenephosphonate ester mixture, containing compounds having the general Formula V noted above, and including compounds (8), (15) and (17) above, has satisfactory viscosity at low temperatures, low pour point, and a thermal stability of about 500° F. to about 600° F. Such phosphonate ester mixture has a high autoignition temperature, good hydrolytic stability, and high fire resistance.

EXAMPLE 5

Compounds (1), (2), (3), (5), (10), (11), (14), (16) and (18) are prepared by procedure similar to that described above in Examples 1, 2 and 3, except employing in each instance the appropriate corresponding fluorinated alcohol.

The resulting bis (polyfluoroalkyl) benzenephosphonate esters thus obtained have properties generally similar to those of compounds (7), (8) and (9) of Examples 1 to 3 above.

From the foregoing, it is seen that the invention provides a novel class of bis (polyfluoroalkyl) benzenephosphonates which are designed particularly for use as base stocks of hydraulic fluids in aircraft systems, and which are also useful as lubricants and as heat transfer or cooling media over a wide temperature range, in aircraft systems.

While we have described particular embodiments of our invention for the purpose of illustration, it should be understood that various modifications and adaptations thereof may be made within the spirit of the invention, as set forth in the appended claims.

We claim:

1. A bis (polyfluoroalkyl) benzenephosphonate having the formula

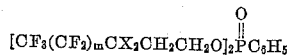

where $m$ is an integer of 1 to 2, and X is a member selected from the group consisting of hydrogen and fluorine.

2. The compound having the formula

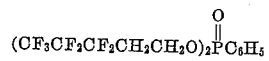

3. The compound having the formula

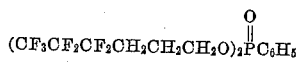

4. A bis (polyfluoroalkyl) benzenephosphonate having the formula
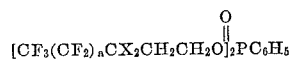
where $a$ is an integer of from 0 to 8, and X is a member selected from the group consisting of hydrogen and fluorine.
References Cited
UNITED STATES PATENTS
3,071,609   1/1963   Campbell et al. _____ 260—951
CHARLES B. PARKER, *Primary Examiner.*
BERNARD BILLIAN, *Assistant Examiner.*